United States Patent Office 3,409,586
Patented Nov. 5, 1968

3,409,586
DIOLEFIN RUBBER VULCANIZATE STABILIZED WITH N - ALKYL - N' - o - SUBSTITUTED - PHENYL PARAPHENYLENEDIAMINE
Arthur E. Oberster, North Canton, Ohio, assignor to The Firestone Tire & Rubber Company, Akron, Ohio, a corporation of Ohio
No Drawing. Filed Jan. 7, 1966, Ser. No. 519,293
12 Claims. (Cl. 260—45.9)

ABSTRACT OF THE DISCLOSURE

Diolefin rubber vulcanizate contains an antiozonant amount of N-alkyl-N'-o-substituted-phenyl-para-phenylenediamine.

---

This invention relates to new antiozonants for diolefin rubbers.

The antiozonants are N-alkyl-N'-o-substituted-phenyl-para-phenylenediamines in which the alkyl group is from the class consisting of cycloalkyl groups of five to seven carbon atoms and lower alkyl groups of three to seven carbon atoms and the ortho substituent is from the class consisting of halogen, alkyl groups of 1 to 3 carbon atoms, and —OR in which R is an alkyl group containing 1 to 2 carbon atoms. The preferred derivatives are the N-cyclohexyl- and N-sec-alkyl-N'-o-substituted-phenyl-para-phenylenediamines. The sec-alkyl derivatives are more readily obtained than the corresponding normal and tertiary isomers and are preferred for this reason and because they are generally (but not always) more effective as antiozonants.

It is well known in the art that the N-cyclohexyl- and N-lower alkyl-N'-phenyl-para-phenylenediamines are good antiozonants. However, the compounds in which the phenyl is para-substituted or unsubstituted are toxic. The ortho-substituted phenyl derivatives are generally toxic unless the N-alkyl group contains at least 3 carbon atoms.

The diolefin rubbers in which the antiozonants are effective include natural rubber, polybutadienes, polyisoprenes, various copolymers of conjugated diolefins and vinyl compounds, such as SBR (copolymer of butadiene and styrene) and NBR (copolymer of butadiene and acrylonitrile), copolymers of butadiene or isoprene with alpha-methylstyrene, ring-substituted styrenes, chloromethyl styrene, etc., butadiene-isoprene copolymer, isobutylene-isoprene, isobutylene-cyclopentadiene, vinyl-pyridines, ethylene-propylene terpolymers, etc. The amount of antiozonant used is the usual amount which may vary from 0.10 to 5 parts per 100 parts of the rubber. The vulcanization is carried out at any usual vulcanization temperature.

The o-substituted phenyl derivatives are especially useful in stocks containing a high percentage of carbon black and in oil-extended rubbers (e.g. oil-extended polybutadiene, polyisoprene and butadiene-styrene), etc.

The preferred antiozonants of this invention include, for example:

N-isopropyl-N'-o-tolyl-p-phenylenediamine
N-sec-butyl-N'-o-tolyl-p-phenylenediamine
N-sec-amyl-N'-o-tolyl-p-phenylenediamine
N-sec-hexyl-N'-o-tolyl-p-phenylenediamine
N-isopropyl-N-o-ethylphenyl-p-phenylenediamine
N-sec-butyl-N'-o-ethylphenyl-p-phenylenediamine
N-sec-amyl-N'-o-ethylphenyl-p-phenylenediamine
N-sec-hexyl-N'-o-ethylphenyl-p-phenylenediamine
N-isopropyl-N'-o-chloro- and bromophenyl-p-phenylenediamines
N-sec-butyl-N'-o-chloro- and bromophenyl-p-phenylenediamines
N-sec-amyl-N'-o-chloro- and bromophenyl-p-phenylenediamines
N-sec-hexyl-N'-o-chloro- and bromophenyl-p-phenylenediamines
N-cyclohexyl-N'-o-tolyl-p-phenylenediamine.

Any usual amount of antiozonant may be employed and, generally, it will be in the range of about 0.10 to 5 percent, based on the weight of the rubber. Where mixtures of antiozonants are employed, even smaller amounts may be used.

The invention does not lie in the simple fact that these compounds are antiozonants, but in the fact that they are nontoxic antiozonants, and the unvulcanized rubber stocks and vulcanizates containing them are non-toxic. The fact that the compounds are non-toxic was determined by the following tests.

Toxicity test and rating

The toxicity ratings were determined by means of the "Patch Test" technique substantially as described in Occupational Diseases of the Skin, Schwartz, Tulyson and Peck, 2nd ed., Lea & Febiger, 1947, pages 54–64. The test was modified as follows: The chemicals were applied in 5 percent solutions of Vaseline on ½-inch square contact material (gauze) using fifteen subjects for each test. The patches were applied and kept on for 48 hours, then taken off and the irritation produced was rated. After 7 to 10 days the patches were applied for 48 hours and again removed. Irritation reactions are those which gave a reaction with the first application. Sensitization reactions are those which do not necessarily cause irritation on first contact but effect specific changes in the skin such that, after five to seven days or more, further contact on the same or other parts of the body causes dermatitis, and if there was irritation on the first contact, a sensitization reaction was evidenced by an increase in severity of the reaction.

In reporting the reactions, they were graded as follows:

+ erythema on patch area.
++ erythema and edema at patch area.
+++ erythema, edema, papules and a few vesicles at patch area.
++++ erythema, edema, many vesicles and, in some cases, ulceration at patch area.

Weighing the various results by the number of +'s, as in the foregoing list, a toxicity rating for the different antiozonants was determined by this formula:

$$\frac{\text{Total number of }+\text{'s}}{\text{Total number of subjects}} = \text{Numerical Rating}$$

Normally, these numerical ratings were converted to comparative ratings, as follows:

0 to 0.50=non-irritating or sensitizing
0.5 to 1.0=slightly irritating or sensitizing
1.0 to 2.0=moderately irritating or sensitizing
2.0 to 3.0=severely irritating or sensitizing
Over 3.0=extremely irritating or sensitizing.

However, the only ratings recorded in the tests were:

0 to 0.5 recorded in the table as Non
0.5 to 1.0 recorded in the table as Sli (for slightly)
1.0 to 2.0 recorded in the table as Mod (for moderately).

The results of toxicity tests on various p-phenylenediamine derivatives are recorded in Table I. To clarify the comparison of the o-substituted phenyl derivatives with the phenyl and p-substituted phenyl derivatives, the various compounds are identified by their substituents only—they are all p-phenylenediamine derivatives. They are identified by number in Table I, and in Table II the compounds are identified by number only, using the same numbers. The headings of Table I are: Irr. Reaction—Irritation Reaction; Sens. Reaction—Sensitization Reaction; Irr. Rat.—Irritation Rating; Sens. Rat.—Sensitization Rating.

TABLE I.—TOXICITY TESTS

| Compound number | Irr. Reaction | Sens. Reaction | Irr. Rat. | Sens. Rat. |
|---|---|---|---|---|
| 1. N-isopropyl-N'-phenyl- | 9 neg., 2+++, 1++, 3+ | 11 neg., 2++, 2+++ | Sli. | Sli. |
| 2. N-isopropyl-N'-o-tolyl- | 14 neg., 1± | 12 neg., 3+ | Non. | Non. |
| 3. N-isopropyl-N'-p-tolyl- | 14 neg., 1± | 5 neg., 1±, 9+ | Non. | Sli. |
| 4. N-isopropyl-N'-o-methoxyphenyl- | 13 neg., 2± | 12 neg., 3+ | Non. | Non. |
| 5. N-isopropyl-N'-p-methoxyphenyl- | 10 neg., 3±, 2+ | 8 neg., 6+, 1++ | Non. | Sli. |
| 6. N-isopropyl-N'-o-ethoxyphenyl- | 15 neg. | 15 neg. | Non. | Non. |
| 7. N-isopropyl-N'-p-ethoxyphenyl- | 2 neg., 1±, 10+, 2++ | 1±, 6+, 7++, 1+++ | Sli. | Mod. |
| 8. N-cyclohexyl-N'-o-tolyl- | 15 neg. | 15 neg. | Non. | Non. |
| 9. N-cyclohexyl-N'-o-methoxyphenyl- | 15 neg. | 15 neg. | Non. | Non. |
| 10. N-sec-hexyl-N'-o-tolyl- | 15 neg. | 11 neg., 1±, 3+ | Non. | Non. |
| 11. N-sec-hexyl-N'-o-methoxyphenyl- | 15 neg. | 15 neg. | Non. | Non. |
| 12. N-sec-hexyl-N'-o-ethoxyphenyl- | 15 neg. | 15 neg. | Non. | Non. |

Note that all of the o-substitued phenyl (i.e. o-tolyl, o-methoxyphenyl, etc.) derivatives show no evidence of toxicity whereas the p-substituted phenyl derivatives are not free of toxicity. The claimed compounds are therefore unexpectedly superior for rubber products with which the factory operates and the public generally may come into contact.

Table II shows that these compounds (identified by the same numbers used for identification in Table I) are antiozonants and have good physical properties before and after aging. The compound identified as number 0 was a blank. The compounds were tested in a vulcanizable compound of LTP (low temperature copolymer of butadiene-styrene) containing HAF (high-abrasion furnace black) and 2 parts of the different antiozonants.

All stocks were cured for 60 minutes at 280° F. The antiozonant properties were determined after aging in an ozone chamber with the stocks exposed to 60 parts per million ozone at 95° F. for 7 hours, under static (12½% elongation) and dynamic (20% elongation) conditions. The strips were then examined under 5-power magnification and the degree of cracking evaluated visually and rated on the following scale: None—no visible cracking; V. V. Sli.—very, very slight cracking; V. Sli.—very slight cracking.

The physical properties are recorded before aging (under the heading Normal Physical Properties) and after oven aging for 2 days at 212° F. (under the heading Aged Properties). Modulus and tensile strength (abbreviated as Mod. and T.S.) are recorded in pounds per square inch and elongation (abbreviated to Elong.) is recorded in percent.

What I claim is:
1. A diolefin-rubber vulcanizate which contains an antiozonant amount of antiozonant having the formula

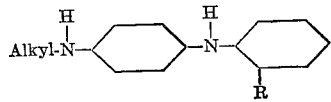

in which alkyl is from the class of cycloalkyl groups of five to seven carbon atoms and straight-chain and branched-chain lower alkyl groups of 3 to 6 carbon atoms, and R is from the class consisting of alkyl groups of 1 to 3 carbon atoms, methoxy, ethoxy, chloro and bromo.

2. The vulcanizate of claim 1 in which the antiozonant R is methyl.

3. The vulcanizate of claim 1 in which the antiozonant is N-isopropyl-N'-o-tolyl-para-phenylenediamine.

4. The vulcanizate of claim 1 in which the antiozonant is N - isopropyl - N' - o-methoxyphenyl-para-phenylenediamine.

5. The vulcanizate of claim 1 in which the antiozonant is N-sec-hexyl-N'-o-tolyl-para-phenylenediamine.

6. The vulcanizate of claim 1 in which the antiozonant is N - sec - hexyl - N'-o-methoxyphenyl-para-phenylenediamine.

7. The vulcanizate of claim 1 in which the rubber is butadiene-styrene copolymer.

8. The vulcanizate of claim 7 in which the antiozonant is n-isopropyl-N'-o-tolyl-para-phenylenediamine.

9. The vulcanizate of claim 7 in which the antiozonant is N - isopropyl - N' - o-methoxyphenyl-para-phenylenediamine.

10. The vulcanizate of claim 7 in which the antiozonant is N-sec-hexyl-N'-o-tolyl-para-phenylenediamine.

11. The vulcanizate of claim 7 in which the antiozonant is N - sec - hexyl - N'-o-methoxyphenyl-para-phenylenediamine.

12. The vulcanizate of claim 7 in which the antiozonant R is methyl.

TABLE II.—ANTIOZONANT EVALUATION

| Compound Number | Ozone Evaluation | | Normal Physical Properties | | | Aged Properties | | |
|---|---|---|---|---|---|---|---|---|
| | Static | Dynamic | 300% Mod. | T.S. | Elong. | 300% Mod. | T.S. | Elong. |
| 1 | None | V.V.Sli. | 1,475 | 3,650 | 530 | 2,650 | 3,075 | 390 |
| 2 | None | V.V.Sli. | 1,350 | 3,375 | 550 | 2,450 | 2,875 | 340 |
| 3 | None | V.V.Sli. | 1,650 | 3,300 | 500 | 2,525 | 2,525 | 300 |
| 4 | None | V.V.Sli. | 1,300 | 3,375 | 550 | 2,500 | 2,625 | 310 |
| 5 | None | None | 1,475 | 3,250 | 510 | 2,375 | 2,625 | 320 |
| 6 | None | V.V.Sli. | 1,350 | 3,450 | 520 | 2,600 | 2,900 | 320 |
| 7 | None | V.V.Sli. | 1,375 | 3,600 | 590 | 2,275 | 2,500 | 320 |
| 8 | None | V.V.Sli. | 1,375 | 3,550 | 570 | 2,400 | 2,925 | 340 |
| 9 | None | V.V.Sli. | 1,300 | 3,575 | 580 | 1,275 | 3,300 | 580 |
| 10 | None | None | 1,450 | 3,500 | 550 | 2,400 | 2,900 | 350 |
| 11 | None | None | 1,350 | 3,400 | 580 | 1,575 | 3,325 | 570 |
| 12 | None | V.V.Sli. | 1,275 | 3,475 | 580 | 1,350 | 3,550 | 570 |
| 0 | None | V.Sli. | 1,425 | 3,550 | 560 | 2,700 | 2,700 | 300 |

The vulcanizates containing the new compounds have good physical properties, comparing favorably with the vulcanizates containing the N'-unsubstituted phenyl and p-substituted phenyl derivatives.

(References on following page)

References Cited

UNITED STATES PATENTS

| | | | |
|---|---|---|---|
| 3,027,351 | 3/1962 | Lichty | 260—45.9 |
| 3,000,852 | 9/1961 | Merz | 260—45.9 |
| 3,163,616 | 12/1964 | Stahly | 260—45.9 |

DONALD E. CZAJA, *Primary Examiner.*

H. E. TAYLOR, *Assistant Examiner.*